(12) United States Patent
Taylor

(10) Patent No.: US 10,761,622 B2
(45) Date of Patent: Sep. 1, 2020

(54) PRESSURE SENSING ON A TOUCH SENSOR USING CAPACITANCE

(71) Applicant: CIRQUE CORPORATION, Salt Lake City, UT (US)

(72) Inventor: David C. Taylor, West Jordan, UT (US)

(73) Assignee: Cirque Corporation, Sandy, UT (US)

( * ) Notice: Subject to any disclaimer, the term of this patent is extended or adjusted under 35 U.S.C. 154(b) by 153 days.

(21) Appl. No.: 15/473,426

(22) Filed: Mar. 29, 2017

(65) Prior Publication Data

US 2017/0285777 A1    Oct. 5, 2017

Related U.S. Application Data

(60) Provisional application No. 62/314,859, filed on Mar. 29, 2016.

(51) Int. Cl.
*G06F 3/0354* (2013.01)

(52) U.S. Cl.
CPC ................................ *G06F 3/03547* (2013.01)

(58) Field of Classification Search
CPC .... G06F 3/03547; G06F 3/041; G06F 3/0414; G06F 3/0416; G06F 3/044; G06F 2203/04105
USPC .................................................. 345/173, 174
See application file for complete search history.

(56) References Cited

U.S. PATENT DOCUMENTS

| | | | | |
|---|---|---|---|---|
| 4,516,091 A * | 5/1985 | Sasser | ...................... | H01H 3/24 333/105 |
| 5,367,136 A * | 11/1994 | Buck | .................. | H01H 59/0009 200/181 |
| 5,578,976 A * | 11/1996 | Yao | ..................... | H01H 59/0009 200/181 |
| 6,377,438 B1 * | 4/2002 | Deane | ...................... | H01G 5/18 361/277 |
| 6,806,545 B2 * | 10/2004 | Shim | .................. | H01H 59/0009 257/415 |
| 7,501,920 B2 * | 3/2009 | Yuba | .................... | H01H 50/005 200/181 |
| 8,928,435 B2 * | 1/2015 | Despont | ................. | H01H 59/00 335/78 |
| 9,496,868 B2 * | 11/2016 | Payne | ..................... | G06F 3/044 |
| 10,580,605 B2 * | 3/2020 | Tabib-Azar | ......... | H01L 41/1136 |
| 2004/0061579 A1 * | 4/2004 | Nelson | .................. | B81B 3/0054 335/78 |
| 2007/0181963 A1 * | 8/2007 | Berkcan | ............. | G01R 33/0286 257/415 |
| 2011/0057899 A1 * | 3/2011 | Sleeman | ................. | G01L 1/146 345/174 |
| 2011/0094861 A1 * | 4/2011 | Feng | .................... | H01H 1/0094 200/181 |

(Continued)

*Primary Examiner* — Jason M Mandeville

(57) ABSTRACT

A system and method for measuring pressure by using two substrates that are separated by a distance, each substrate having at least one electrode, and wherein touch sensor capacitance circuitry coupled to electrodes on each of the substrates and transmitting a drive signal may be used to detect a bending or deflection of at least one of the substrates by measuring a change in distance between the electrodes on the different substrates when pressure is applied to one of the substrates, and wherein a compressible substrate may be disposed between the two substrates.

8 Claims, 7 Drawing Sheets

(56) References Cited

U.S. PATENT DOCUMENTS

| | | | | |
|---|---|---|---|---|
| 2011/0113371 A1* | 5/2011 | Parker | ............... | G06F 1/3215 |
| | | | | 715/810 |
| 2011/0192229 A1* | 8/2011 | Chen | ............... | G01R 33/0286 |
| | | | | 73/514.32 |
| 2012/0319969 A1* | 12/2012 | Yamamoto | ......... | G06F 3/03547 |
| | | | | 345/173 |
| 2013/0082979 A1* | 4/2013 | Rabu | ................ | G06F 3/0414 |
| | | | | 345/175 |
| 2013/0127773 A1* | 5/2013 | Kwon, II | ............ | G06F 3/0416 |
| | | | | 345/174 |
| 2016/0188082 A1* | 6/2016 | Ham | ................ | G06F 3/0416 |
| | | | | 345/174 |

* cited by examiner

PRESSURE SENSING ON A TOUCH SENSOR USING CAPACITANCE

BACKGROUND OF THE INVENTION

Field of the Invention

This invention relates generally to touch sensors. Specifically, the invention pertains to a system and method for sensing pressure using capacitance sensing technology that may be found in a touch sensor.

Description of Related Art

There are several designs for capacitance sensitive touch sensors which may take advantage of a system and method for combining a secure PIN pad and a touch screen using a single touch controller. It is useful to examine the underlying technology of the touch sensors to better understand how any capacitance sensitive touchpad can take advantage of the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

It should be understood that use of the term "touch sensor" throughout this document may be used interchangeably with "proximity sensor", "touch and proximity sensor", "touch panel", "touchpad" and "touch screen".

BRIEF SUMMARY OF THE INVENTION

In a first embodiment, the present invention is a system and method for measuring pressure by using two substrates that are separated by a distance, each substrate having at least one electrode, and wherein touch sensor capacitance circuitry coupled to electrodes on each of the substrates and transmitting an active or drive signal (hereinafter a "drive signal") may be used to detect a bending or deflection of at least one of the substrates by measuring a change in distance between the electrodes on the different substrates when pressure is applied to one of the substrates, and wherein a compressible substrate may be disposed between the two substrates.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
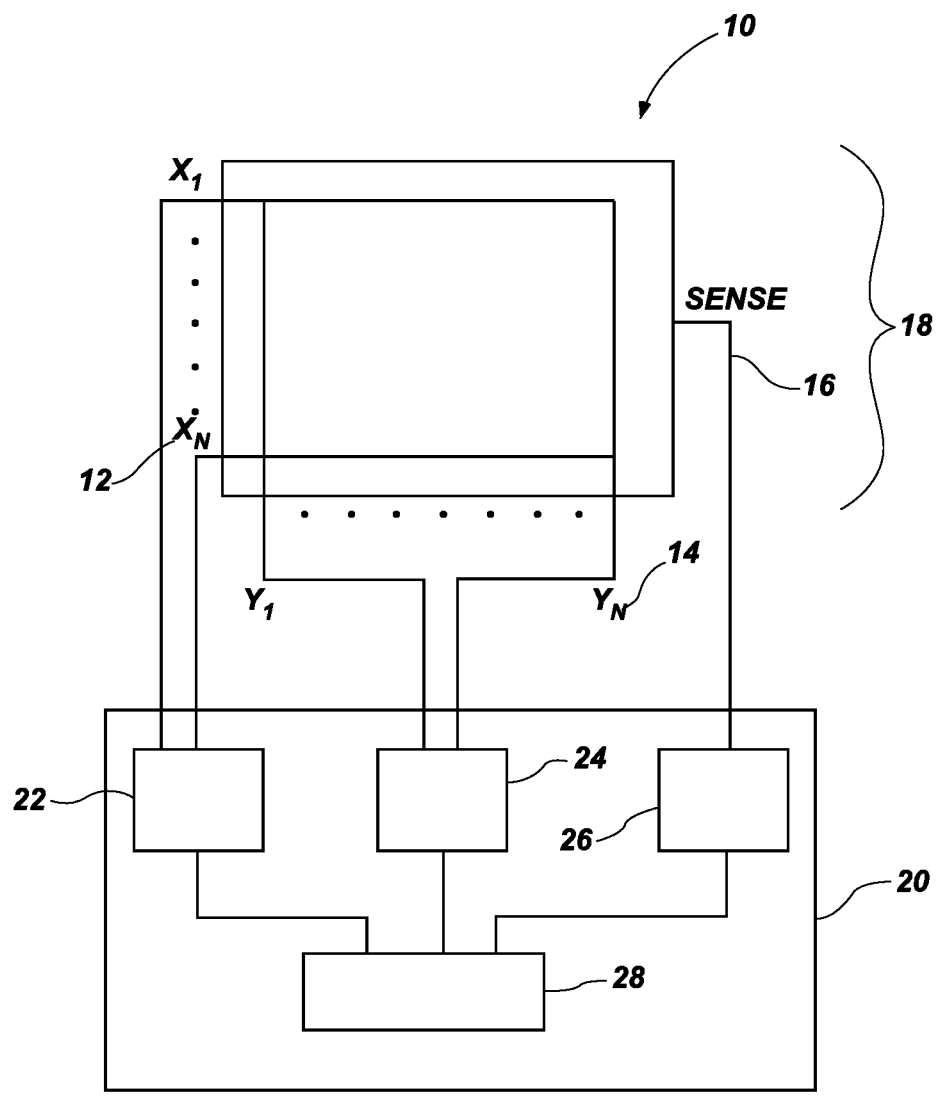
FIG. 1 is a block diagram of operation of a touchpad that is found in the prior art, and which is adaptable for use in the present invention.
Figure 2:
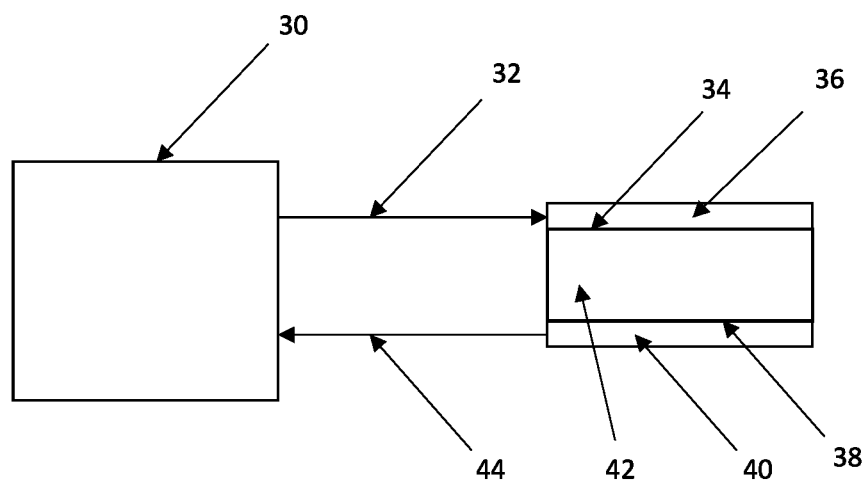
FIG. 2 is a block diagram of a first embodiment of the invention.

In a first embodiment of the invention shown in a block diagram in FIG. 2, a touch controller 30 that may be used in a touch sensor provides a drive signal through a drive trace 32 to at least one drive electrode 34 disposed on a first substrate 36. A signal may be received by at least one sense electrode 38 disposed on a second substrate 40 that is separated from the at least one drive electrode 34 by a compressible material 42, and is transmitted by a sense trace 44 to the touch controller 30. The touch controller 30 may be capable of detecting a change in capacitance between the at least one drive electrode 34 and the at least one sense electrode 38.

One of the advantages of the first embodiment is that the drive signal that is transmitted by the touch controller 30 may be an active signal that operates at a specific frequency or a specific range of frequencies. An advantage over a static pressure sensing system may be that the active drive signal may be selected to be a frequency or frequencies that avoid noise that may otherwise interfere with the pressure sensing system.

For the purposes of this first embodiment, the principles of operation of the pressure sensing system of the first embodiment are the same whether there is one drive electrode or a plurality of drive electrodes, and one sense electrode or a plurality of sense electrodes. Accordingly, it may be assumed that there is at least one drive electrode, but possible more, and at least one sense electrode, but possibly more, and the results will be the same. Specifically, the first embodiment may detect a change in distance between the two substrates.

Figure 3A:
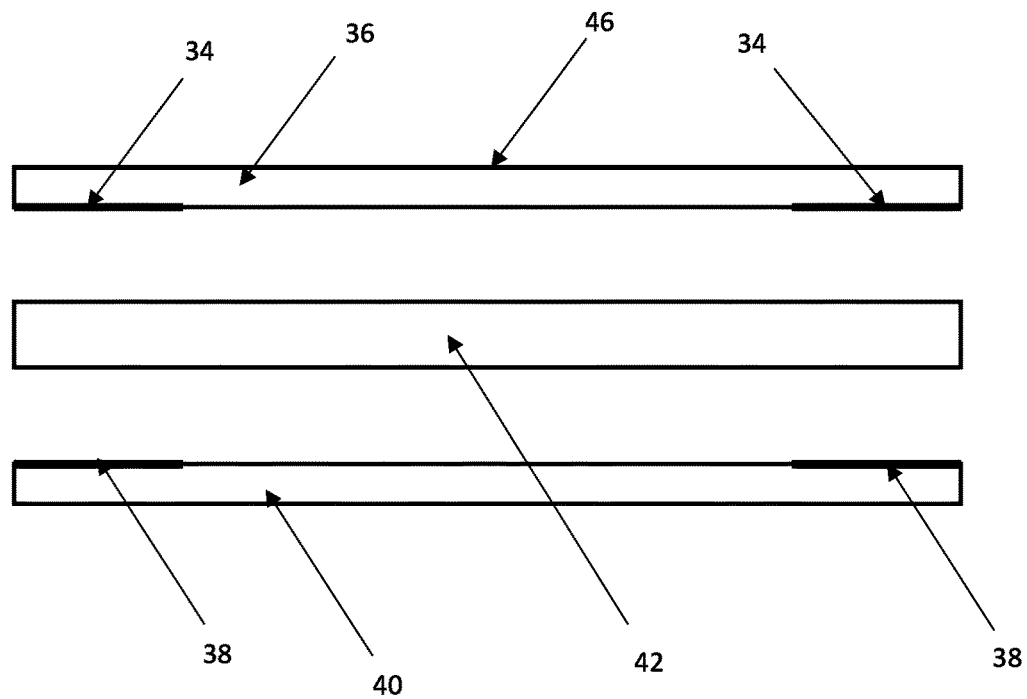
FIG. 3A is an expanded profile view of the substrates and electrodes of the first embodiment of the invention.

FIG. 3A shows an expanded view of the first embodiment of the invention. The first embodiment may be comprised of first substrate 36 or top substrate which may function as a touch sensor 46 that is capable of detection and tracking of movements of a pointing object on a top surface thereof. The first substrate 36 may be a rigid or flexible material. Disposed on a bottom side of the touch sensor 46 is at least one electrode. The at least one electrode may be a drive electrode 34 or a sense electrode 38.

The next or middle substrate may be a compressible material referred to as the compressible substrate 42. The bottom or second substrate 40, which may be a rigid or flexible material, is positioned such that the compressible substrate 42 is disposed between the first substrate 36 and the second substrate 40. The second substrate 40 may also include at least one electrode on a top surface. The at least one electrode may be a drive electrode 34 or a sense electrode 38. What is important is that the at least one electrode on the first substrate 36 performs a different function from the at least one electrode on the second substrate 40. Thus, if the at least one electrode on the first substrate 36 is a drive electrode 34, then the at least one electrode on the second substrate 40 is a sense electrode 38, or vice versa.

The compressible substrate 42 may be compressed when a force is applied to a top surface of the first substrate 36. The force may compress the compressible substrate 42, and the change in distance between the first substrate 36 and the second substrate 40 may be detectable by the touch controller 30 (see FIG. 2) that is coupled to the at least one electrode on the first substrate and the at least one electrode on the second substrate, even if the compression of the compressible substrate is very small. In other words, the sensitivity of the touch controller 30 is very high, and may be capable of detecting very minute changes in the distance between the first substrate 36 and the second substrate 40 that may be caused by a finger or other pointing object making contact with and pressing on the surface of the first substrate.

For example, the touch controller 30 may be capable of detecting changes in the compressible substrate 42 that are not visible to the naked eye but which are detectable because of the high sensitivity of the touch controller.

The touch controller 30 may also be capable of detecting a specific range of pressure on the first substrate 36, and not just detect that a change has occurred. In other words, a user may be able to touch the first substrate 36 and progressively apply more and more pressure, the change of which may be detectable because of the sensitivity of the touch controller 30.

In another aspect of the first embodiment, the electrodes 34, 38 may be disposed in various locations of the first substrate 36 and the second substrate 40. It may be desirable to dispose the electrodes 34, 38 directly opposite each other on the first and the second substrates 36, 40. For example, if the touch sensor 46 is a rectangle or square, the electrodes may be disposed in all the corners of the first and second substrates 36, 40. Placing the electrodes 34, 38 in the corners of a square or rectangular substrate provides assurance that pressure on any location of the first substrate will be detectable.

Alternatively, if the touch sensor 46 is in the shape of a circle or an ellipse, the electrodes 34, 38 may be disposed equidistantly around the edges so that any pressure applied at any location on the first substrate 36 may be detectable.

It should also be understood that the second substrate 40 may not need to be formed to have the same shape as the first substrate 36 or the compressible substrate 42. In other words, the second substrate may be a larger substrate of a size and shape that allows the first substrate 36 to compress the compressible substrate 42 when force is applied to the first substrate. What may be important is that the electrodes 34 on the first substrate 36 are aligned with the electrodes 38 on the second substrate 38.

FIG. 3A shows some electrodes 34, 38 disposed on the first substrate 36 and the second substrate 40. The actual position of the electrodes 34, 38 and the thicknesses of the electrodes and the substrates 36, 40 is for illustration purposes only and should not be considered to be limiting of the concepts of the first embodiment.

Figure 3B:
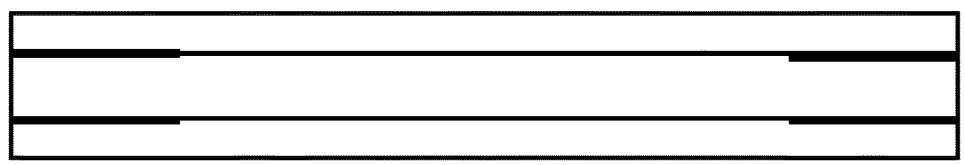
FIG. 3B is a profile view of the substrates and electrodes of the first embodiment of the invention.

FIG. 3B shows a non-expanded view of the electrodes 34, 36 and the substrates 36, 40 of the first embodiment.

In an alternative embodiment, it may be possible to dispose the electrodes 34, 38 on opposite sides of the compressible substrate 42, while the first and second substrates 36, 40 only service as a surface on which to apply pressure against the compressible substrate.

Figure 4A:
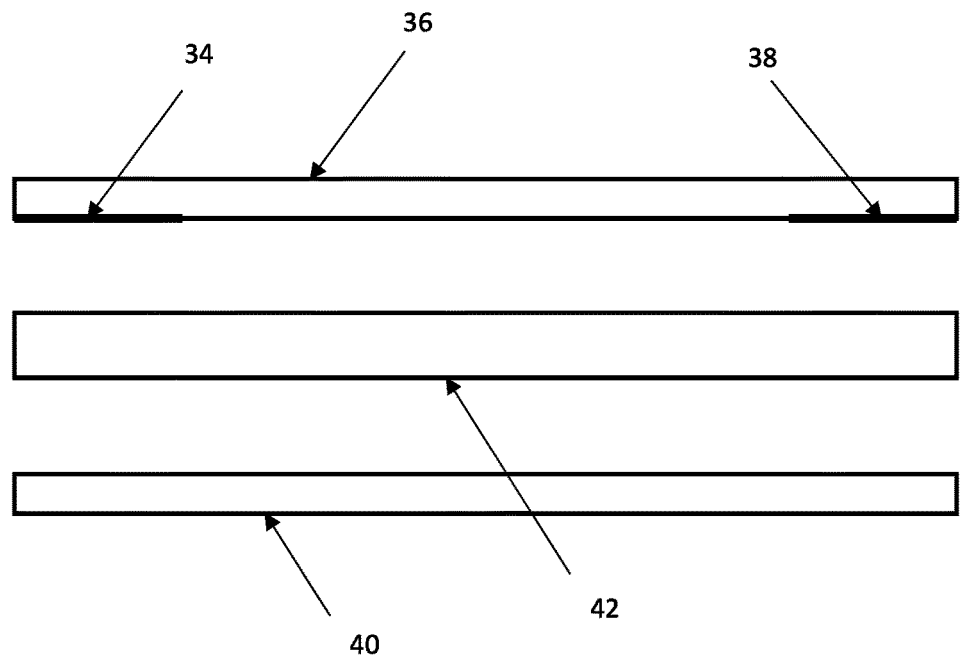
FIG. 4A is an expanded profile view of the substrates and electrodes of a second embodiment of the invention.
Figure 4B:
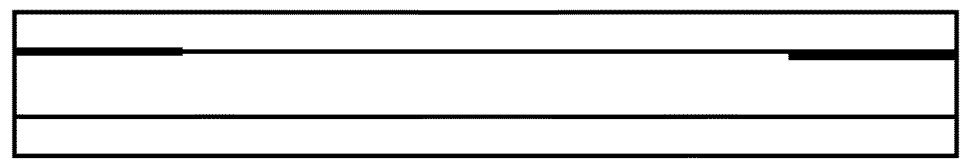
FIG. 4B is a profile view of the substrates and electrodes of the second embodiment of the invention.

In a second embodiment of the invention shown in FIGS. 4A and 4B, a change is made to the location of the electrodes 34, 38 on the substrates 36, 40. Instead of the drive electrodes 34 being on one substrate and the sense electrodes 38 being on a different substrate, the drive and sense electrodes 34, 38 may be disposed on the same substrate. For example, assume that the drive 34 and sense 38 electrodes are disposed on the first substrate 36. The compressible substrate 42 may still be comprised of the compressible material. However, the second substrate 40 may be tied to ground, tied to VDD, or it may be floating.

Pressure applied to the first substrate 36 which causes compression of the compressible substrate 42 may still be detectable by a touch controller 30 that is coupled to the drive 34 and sense 38 electrodes on the first substrate 36. A change in capacitance between the drive 34 and the sense 38 electrodes may be caused by the movement of the first substrate 36 as it gets closer to the second substrate 40 and changes the capacitance measured between the drive 34 and the sense electrodes 38 because of some coupling to the second substrate 40.

In the alternative, it should be understood that the drive and the sense electrodes may be disposed on the second substrate 40 and the first substrate 36 may be tied to ground, to VDD, or allowed to be electrically floating.

FIG. 4A shows that the electrodes 34, 38 may be on the first substrate 36 or the second substrate 40. The actual positions of the electrodes 34, 38 and the thicknesses of the substrates 36, 40 is for illustration purposes only and should not be considered to be limiting of the concepts of the embodiments.

Figure 5:
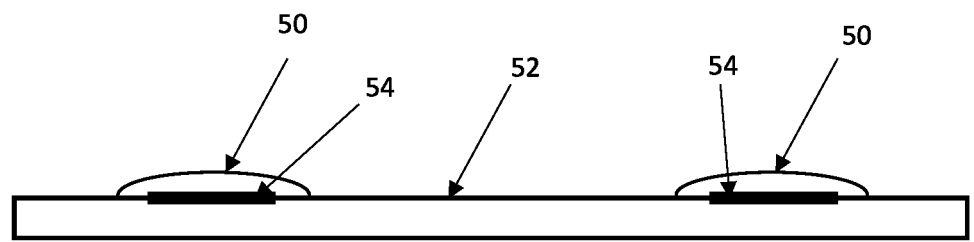
FIG. 5 is a profile view of the substrate, electrodes and snap domes of a third embodiment.

In a third embodiment of the invention shown in FIG. 5, a substrate 52 may have one or more snap domes 50 disposed on a surface thereof. Touch sensor elements 54 (drive and sense electrodes) may be disposed underneath the snap domes 50 such that when a finger presses on a snap dome, the metal material used in the snap dome flexes or deflects from a rest position. The deflection may be measured using a touch controller 30 that is coupled to the drive and sense electrodes 54. The degree of deflection of the snap domes 50 may be detectable, thereby allowing for a range of pressure applied to the snap dome to be detectable. Alternatively, the snap domes 50 are used in an activated/deactivated or on/off configuration, and it is only the change in capacitance that is needed, and not the actual capacitance.

Alternatively, a plurality of snap domes 50 may be disposed on a substrate 52 to thereby enable position information and pressure information to be collected from the plurality of snap domes.

Figure 6:
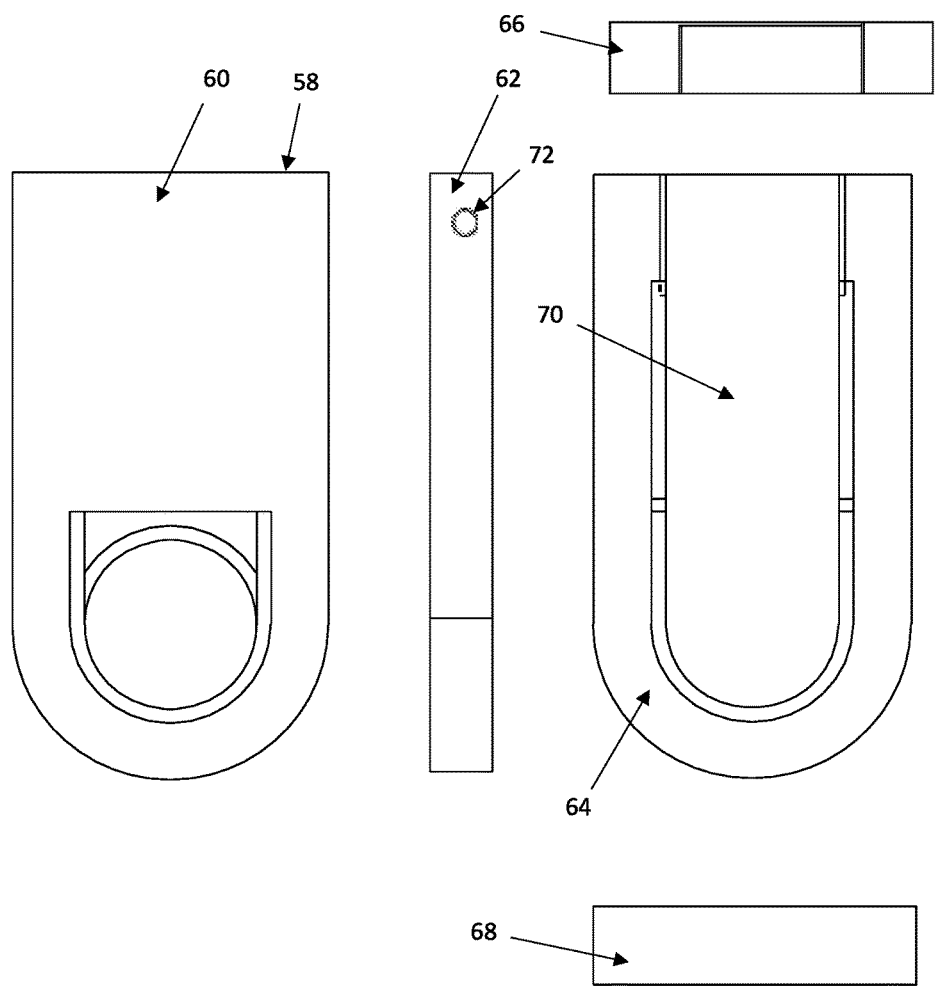
FIG. 6 is a drawing of five views of an implementation of the embodiments of the invention in a force switch having a housing and a lever arm.

In a fourth embodiment of the invention, instead of a compressible substrate between a first and a second substrate, a lever of a force switch may be provided as shown in FIG. 6. FIG. 6 shows five views of a non-conductive housing 58 of a force switch that is provided to support a conductive lever arm 70. The five views include a bottom view 60, a side view 62, a top view 64, a back view 66, and a front view 68. Pressure may be applied to the conductive lever arm 70 which pivots on a pivot bar 72 shown in the side view 62, which moves the conductive lever arm closer to a target (not shown). The target may be disposed under the conductive lever arm 70 in the bottom of the housing 58 or under the bottom surface of the housing itself.

The conductive lever arm 70 and the target may each contain at least one electrode. A touch controller may determine a change in distance between the at least two electrodes (one a drive electrode 34 and one a sense electrode 38), and thereby determine the amount of pressure that is being applied to the conductive lever arm 70.

Figure 7:
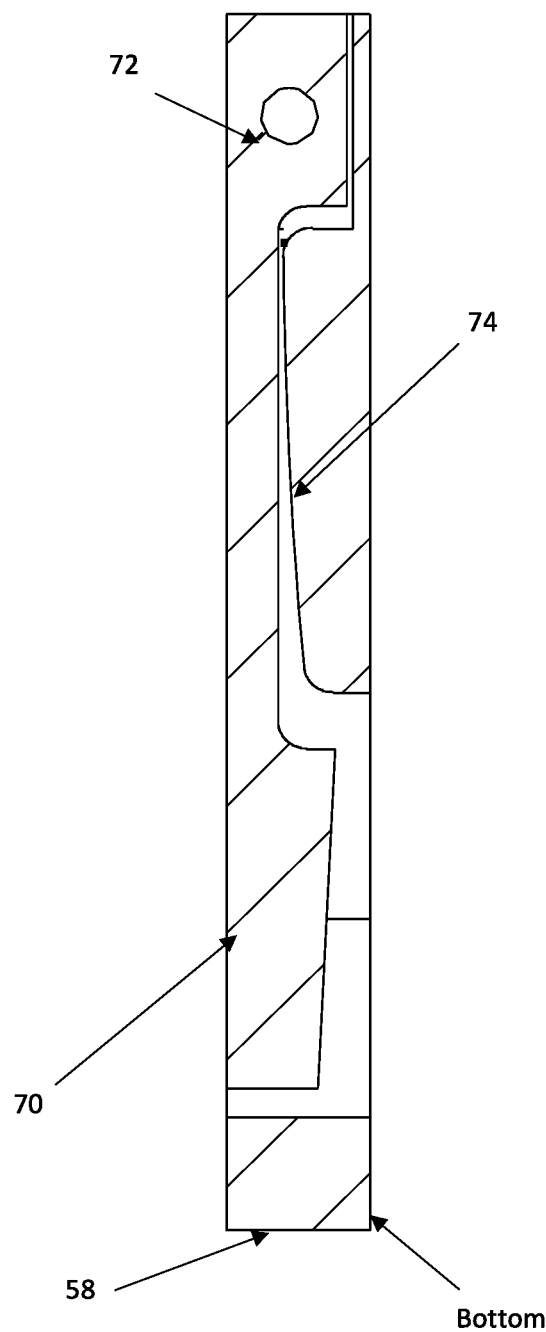
FIG. 7 is a cut-away side view of the housing and the lever arm showing that the lever arm is forced against a ramp under the lever arm that causes the lever arm to bend as a force is applied.

FIG. 7 is a cut-away side view of the force switch with the conductive lever arm 70, the pivot bar 72 and the housing. A ramp 74 within the housing 58 allows the conductive lever arm 70 to be bent along the ramp 74 so that there is a push back against the conductive lever arm.

The concepts of the embodiments of the invention include a method for sensing pressure using capacitance and a drive signal. This is accomplished by providing a touch controller that can determine a change in capacitance measured between at least two electrodes, a first substrate having at least one first electrode disposed thereon that is coupled to the touch controller, and a second substrate having at least one second electrode disposed thereon that is coupled to the touch controller. A compressible substrate may be disposed between the first substrate and the second substrate. The drive signal is applied to the at least one first electrode at a desired frequency or frequencies that may enable the system to avoid noise that would otherwise interfere with a capacitance measurement.

When pressure is applied to the first substrate, a change in capacitance occurs between the at least one first electrode and the at least one second electrode caused by compression of the compressible substrate.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for sensing pressure using capacitance and a drive signal, said method comprising:
   providing a touch controller that can determine a change in capacitance measured between at least two electrodes;
   providing a non-conductive housing;
   providing a conductive lever arm that is separate of and independently movable with respect to a target in the non-conductive housing, the conductive lever arm being disposed above the target;
   providing a ramp disposed within the non-conductive housing configured to push back against the conductive lever arm;
   the conductive lever arm is pivotally movable about a pivot bar;
   disposing at least one drive electrode on the conductive lever arm; disposing at least one sense electrode on the target;
   coupling the at least one drive electrode and the at least one sense electrode to the touch controller;
   applying a drive signal to the at least one drive electrode; and applying a force to the conductive lever arm and measuring a change in capacitance between the at least one drive electrode and the at least one sense electrode caused by movement of the conductive lever arm relative to the target.

2. The method as defined in claim 1 wherein the method further comprises avoiding noise that may interfere with the capacitance measurement between the at least one drive electrode and the at least one sense electrode by providing the drive signal at a frequency that avoids interference from noise.

3. The method of claim 1, wherein applying a force to the conductive lever arm results in rotating the conductive lever arm about the pivot bar.

4. A system for sensing pressure using capacitance and a drive signal, the system comprising:
   a touch controller that determines a change in capacitance measured between at least two electrodes;
   a non-conductive housing;
   a conductive lever arm that is separate of and independently movable with respect to a target in the non-conductive housing, the conductive lever arm being disposed above the target;
   a ramp disposed within the non-conductive housing configured to push back against the conductive lever arm;
   the conductive lever arm is pivotally movable about a pivot bar;
   at least one drive electrode on the conductive lever arm;
   at least one sense electrode on the target;
   the at least one drive electrode and the at least one sense electrode in communication with the touch controller, and the touch controller configured to apply a drive signal to the at least one drive electrode and measure a change in capacitance between the at least one drive electrode and the at least one sense electrode caused by movement of the conductive lever arm relative to the target.

5. The system as defined in claim 4 wherein the touch controller provides a drive signal at a frequency that avoids interference from noise that may interfere with the capacitance measurement between the at least one drive electrode and the at least one sense electrode.

6. The system of claim 4, wherein the conductive lever arm is connected to the non-conductive housing through the pivot bar.

7. A force sensing switch comprising:
   a touch controller that determines a change in capacitance measured between at least two electrodes;
   a housing;
   a lever arm that is movably independent and separate from a target in the housing and the lever arm is disposed above the target;
   a ramp disposed within the housing configured to push back against the lever arm;
   the lever arm is pivotally movable about a pivot bar;
   at least one drive electrode on the lever arm;
   at least one sense electrode on the target;
   the at least one drive electrode and the at least one sense electrode in communication with the touch controller, and the touch controller configured to apply a drive signal to the at least one drive electrode and measure a change in capacitance between the at least one drive electrode and the at least one sense electrode caused by movement of the lever arm relative to the target.

8. The force sensing switch as defined in claim 7 wherein the touch controller provides a drive signal at a frequency that avoids interference from noise that may interfere with the capacitance measurement between the at least one drive electrode and the at least one sense electrode.

* * * * *